US012801623B2

(12) United States Patent

Robichaux et al.

(10) Patent No.: US 12,801,623 B2
(45) Date of Patent: Nov. 17, 2026

(54) PREDICTION NETWORK TO SELECT INTERVENTION MODALITIES

(71) Applicant: BetterUp, Inc., Austin, TX (US)

(72) Inventors: Alexi Robichaux, Austin, TX (US); Moritz Sudhof, San Francisco, CA (US); Jordan Hochenbaum, Long Island City, NY (US); Andrew Reece, Phippsburg, ME (US); Hunter Black, Ojai, CA (US)

(73) Assignee: BetterUp, Inc., Austin, TX (US)

( * ) Notice: Subject to any disclaimer, the term of this patent is extended or adjusted under 35 U.S.C. 154(b) by 0 days.

(21) Appl. No.: 18/916,508

(22) Filed: Oct. 15, 2024

(65) Prior Publication Data

US 2026/0105061 A1 Apr. 16, 2026

(51) Int. Cl.
*G06F 16/25* (2019.01)

(52) U.S. Cl.
CPC .................................. *G06F 16/258* (2019.01)

(58) Field of Classification Search
CPC ......... G09B 7/00; G06F 16/00; G06F 16/258; G06F 16/116; G06F 16/86; G06F 16/211; G06F 16/212; G06F 16/2282
See application file for complete search history.

(56) References Cited

U.S. PATENT DOCUMENTS 10,944,569 B2 * 3/2021 Jawaharlal ............ H04L 9/3236
2009/0259995 A1 * 10/2009 Inmon ................... G06F 40/247 717/131
2010/0332287 A1 * 12/2010 Gates ..................... G06Q 30/02 379/265.09
2013/0054642 A1 * 2/2013 Morin ................... G06F 16/258 707/E17.014
2016/0140857 A1 5/2016 Jimenez
(Continued)

FOREIGN PATENT DOCUMENTS

CN 113379457 A 9/2021
CN 118710376 A 9/2024

OTHER PUBLICATIONS

Zhang, D., Yin, C., Zeng, J. et al. Combining structured and unstructured data for predictive models: a deep learning approach. BMC Med Inform Decis Mak 20, 280 (2020). (Year: 2020).*
(Continued)

*Primary Examiner* — Cheyne D Ly
(74) *Attorney, Agent, or Firm* — Kwan & Olynick LLP

(57) ABSTRACT

In some embodiments, a method receives data for a user from an application that is used for an intervention. The data is analyzed to determine unstructured data and structured data. The method determines a context from the structured data to transform text of the unstructured data to transformed unstructured data. The transformed unstructured data is analyzed via a first model to generate a first prediction fit score for an intervention modality. The first model is configured to analyze text of the unstructured data to determine a fit with the intervention modality. The structured data is analyzed via a second model to generate a second prediction fit score for the intervention modality. The second model is configured to analyze numerical values for features of the structured data to determine the fit with the intervention modality. The method combines the first prediction fit score and the second prediction fit score.

20 Claims, 7 Drawing Sheets

(56) References Cited

U.S. PATENT DOCUMENTS

| | | | | |
|---|---|---|---|---|
| 2016/0180248 | A1* | 6/2016 | Regan | G09B 5/00 706/12 |
| 2016/0275180 | A1* | 9/2016 | Matskevich | G06F 16/93 |
| 2020/0272919 | A1* | 8/2020 | Haimson | G16H 50/20 |
| 2021/0192418 | A1* | 6/2021 | Kishore | G06F 40/10 |
| 2022/0292999 | A1* | 9/2022 | Kratzer | G06N 20/00 |
| 2026/0051008 | A1* | 2/2026 | Diner | G06Q 50/205 |

OTHER PUBLICATIONS

Jacob Devlin, et al., "BERT: Pre-training of Deep Bidirectional Transformers for Language Understanding", Proceedings of NAACL-HLT 2019, pp. 4171-4186, Minneapolis, Minnesota, May 24, 2019, 16 pgs.

International Search Report and Written Opinion for Application No. PCT/US2025/038336, dated Nov. 7, 2025, 9 pgs.

* cited by examiner

PREDICTION NETWORK TO SELECT INTERVENTION MODALITIES

BACKGROUND

Companies attempt to allocate coaching interventions to employees who would benefit the most from respective interventions. There may be different interventions that could be offered and there may be many employees that need to be allocated interventions. Typically, users (e.g., a human resources department or managers) are tasked with manually assigning coaching interventions. However, finding the interventions that would be optimal for specific employees is not often found by the users.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
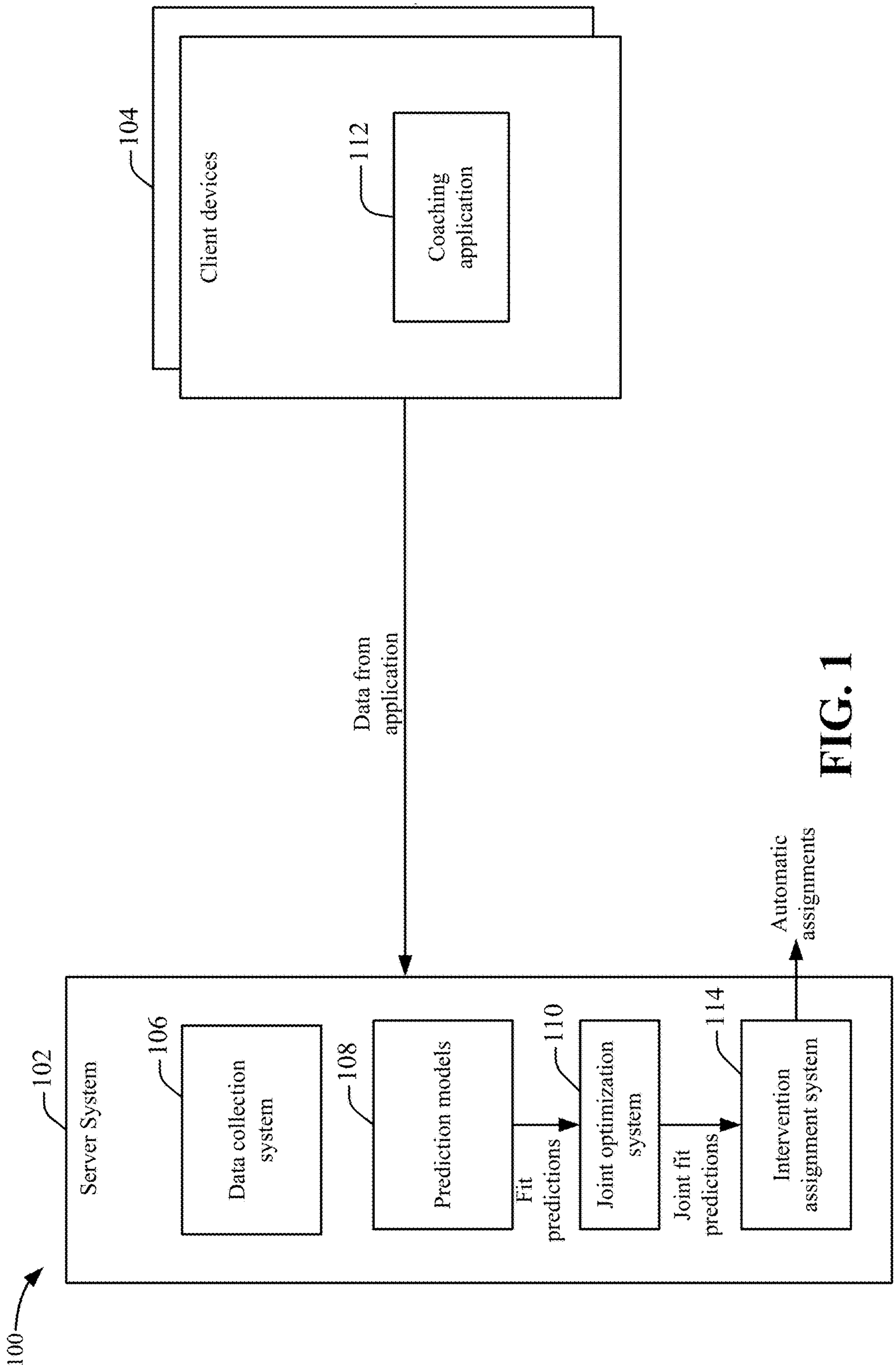
FIG. 1 depicts a simplified system for generating predictions according to some embodiments.

Described herein are techniques for a prediction system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

A system may automatically assign intervention modalities to users of an organization. Intervention modalities may be different types of coaching interventions, such as coaching sessions for users of an organization. The coaching sessions may be useful to support role transitions, such as promotions or changes in focus, can help users achieve higher potentials, can boost team cohesion, can alleviate skill gaps that hamper collaboration and productivity, and can teach inclusion to promote diversity. The assignment of intervention modalities is a time consuming process and hard to optimize manually when a large number of users are assigned to different intervention modalities with constraints such as a number of available interventions.

Typically, the data that is used to assign intervention modalities is analyzed as a single corpus. The data that is collected for a user may be difficult to analyze as a single corpus because the data may be diverse. In some embodiments, the system analyzes different types of data using different models to generate predictions to allocate interventions to users. For example, structured data and unstructured data may be determined from a data set, and separately analyzed to improve the generation of the prediction. To optimize the prediction, the system may use multiple models. For example, a first model may analyze the structured data, and a second model may analyze the unstructured data. The unstructured data may be text-based data, which is analyzed by a model that can analyze relationships among words in the text. The structured data may be numerical data for features that is analyzed by a linear model. Using the different models may optimize the prediction. For example, the first model may output a first fit score for a first intervention modality and the second model may output a second fit score for the first intervention modality. Then, a joint optimization system may combine the outputs from the two models to generate a joint fit score for the first intervention modality. In a similar way, the system may generate joint fit scores for multiple intervention modalities. The joint fit scores for multiple users for multiple intervention modalities may be used to assign interventions to users based on organization constraints.

The system improves the generation of assignments of users to intervention modalities. For example, given a large number of users, an organization can automatically assign interventions to its users. The saves computing resources and time that is required to assign interventions. Also, the organization may have a large amount of data about its users. The use of different models for different types of data may improve the prediction that is generated by isolating different types of data to generate more accurate predictions.

System

FIG. 1 depicts a simplified system 100 for generating predictions according to some embodiments. System 100 includes a server system 102 and client devices 104. Client devices 104 may be used by users (e.g., employees) of an organization. For example, a service that offers coaching for the users may be provided to the organization. The coaching service includes different intervention modalities. An intervention modality may be a different type of intervention service. In some examples, the organization may be a company that has subscribed to the coaching service. The coaching service may include multiple intervention modalities that may be available and different dosages. For example, different modalities include leadership coaching, management coaching, wellbeing coaching, etc. The dosage (e.g., number) of interventions may be limited in supply, different formats (one-on-one, group coaching, and/or self-guided-artificial intelligence), or different in cost though. For example, a limited number of coaches and coaching sessions may be available (e.g., there may be 10 leadership coaching interventions for 10 users available). Although a coaching service is described, other services may be used.

Client devices 104 may be used by users of the organization. A coaching application 112 may be used to input data or track usage for coaching interventions. For example, application 112 may receive answers to questions from an assessment. Also, application 112 may track usage of application 112, such as when intervention modalities are used by respective users and any events that occurred for the coaching interventions. Although a single client device 104 and coaching application 112 may be discussed, similar functions may be provided by other client devices 104 that are being used by other users.

Coaching application 112 may be used to provide answers to an assessment. The assessment may include prompts for answers that can be entered on coaching application 112. In some embodiments, the answers may be a diverse spectrum of data, such as numerical, (e.g., scores from standard assessments), categorical or ordinal (e.g., rankings of preferences), dichotomous (e.g., presence or absence of a characteristic), free-form (e.g., text) etc. The answers received from coaching application 112 may be structured, which limits the inputs to a defined format. Coaching application 112 may also receive unstructured data. For example, the unstructured data may be based on the use of coaching application 112 during an intervention. When an intervention is assigned to a user, the user uses coaching application 112 during the intervention. Data may be received based on the use of coaching application 112. Also, coaching application 112 may be unstructured data from answers to questions in the assessment. The unstructured data may not limit the answers to a defined format.

Some differences between the structured data and the unstructured data is that the unstructured data may not be in a defined format that is known. For example, a first user may write a different answer to a question than a second user. The answer that is received may not have a known format, such as different text may be submitted by different users without any limits on the text that can be written. However, the structured inputs may be restricted to a definition in a data model, such as the same set of known inputs for the users that is defined for respective questions. For example, the users may be restricted from selecting between five different choices, ranking five different choices, assigning a numerical value from 1-10, etc. Here, all users may be restricted to the same set of answers.

Server system 102 includes a data collection system 106, prediction models 108, and a fit prediction system 110. Server system 102 may receive data from coaching application 112. Then, server system 102 may output a joint fit prediction based on the data received. The joint fit prediction may be an intervention modality that is recommended for a user. The assignment of intervention modalities to users may be automatic based on the analysis of the structured data and the unstructured data.

Data collection system 106 may collect the data from coaching application 112 and store the data. The data from coaching application 112 may be first stored as a single source of data. Then, data collection system 106 may extract structured data and unstructured data from the data. The structured data may be based on a dedicated assessment that is designed and validated to measure intrinsic factors about the service, such as coaching readiness, key challenges, motivations, learning style, and time/availability for learning investment. Also, the structured data may be based on other structured inputs, such as a record system (e.g., a number of days in a role, number of days since a last role change, or date joined a company). The structured data format of these inputs is used to validate and benchmark the data to ensure measurements are consistent, reliable, and robust. The unstructured data may be derived from activity on coaching application 112 or answers from the user to the assessment, such as text input to open-ended questions. The open-ended answers may depend on what is input by the user, and may relate to the user's motivation, goals, and preferences regarding the service. The unstructured nature of this data may allow for highly varied, nuanced, and rich inputs from different users.

Prediction models 108 may analyze the different types of data. For example, two types of models may be used, a linear model and a language model. The linear model may analyze structured data inputs and the language model may analyze unstructured data inputs. The language model may analyze text. Also, in some embodiments, the language model may analyze multi-modal unstructured data, such as non-text. Prediction models 108 may output multiple fit prediction scores for each of one or more intervention modalities for each of multiple users. The linear model and the language model will be described in more detail later.

Joint optimization system 110 may analyze the outputs from prediction models 108 and generate a joint fit prediction score for each of one or more intervention modalities for each of multiple users. For example, the joint fit prediction score may rate the gain of a user if assigned to an intervention modality. In some embodiments, a joint fit prediction score may be generated for each intervention modality that is available for a user, and this is done for each user.

An intervention assignment system 114 can analyze the joint fit prediction scores and assign users to intervention modalities per the organizational constraints. For example, intervention assignment system 114 may optimize the assignment based on constraints that specify available intervention modalities and a number of available coaching sessions in the intervention modalities. In some embodiments, intervention assignment system 114 optimizes placing users with higher joint fit prediction scores for intervention modalities than other users with lower joint fit prediction scores for the intervention modalities.

Figure 2:
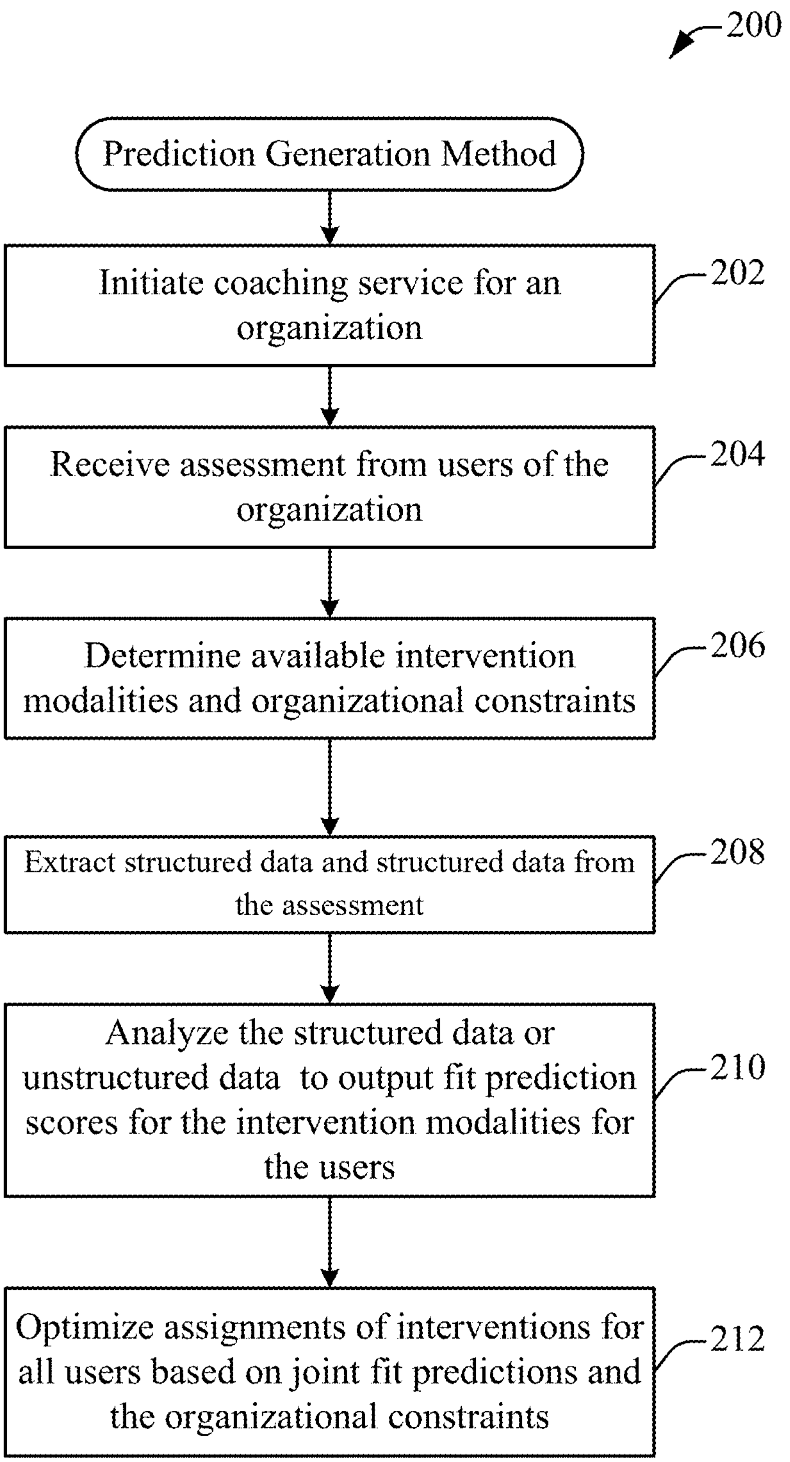
FIG. 2 depicts a simplified flowchart of the process for generating assignments to intervention modalities according to some embodiments.

FIG. 2 depicts a simplified flowchart 200 of the process for generating assignments to intervention modalities according to some embodiments. At 202, server system 102 initiates a coaching service for an organization. For example, the organization may be a company that has subscribed to the coaching service, which may include multiple interventions that may be available in different modalities and dosages. For example, different modalities include different types of intervention, such as leadership coaching, management coaching, wellbeing coaching, etc. The interventions may be human coaching and also artificial intelligence self-guided coaching. The dosage may be an amount of interventions, which may be limited in supply though. For example, a limited number of coaches and coach sessions may be available.

At 204, server system 102 receives an assessment from users of the organization. The assessment may be performed at different times. In some embodiments, the assessment may be received at the beginning of the service before any users are assigned to intervention modalities for the organization. Also, the assessment may be received at other times, such as after the user has used the intervention modalities. The assessment may include multiple questions that can be answered by the user. The answers from the user may be structured data or unstructured data. The following will discuss the assignment of users to intervention modalities based on the assessment. However, as users use intervention modalities that are assigned, server system 102 may incorporate the feedback to determine further assignments. This process will be discussed in more detail in FIG. 6.

At 206, server system 102 determines the available intervention modalities and organizational constraints. The intervention modalities may be the types of interventions that may be provided to the organization. The organizational constraints may be how many interventions may be available for the users in the organization, and the population of users that can be assigned to intervention modalities. Accordingly, server system 102 detects the intervention modalities that are available and the dosages of each.

At 208, server system 102 extracts structured data and unstructured data from the assessment, and metadata about the user, along with other assessment data from the assessment. The data is then processed to be consumed by linear model 308 and language model 304 for structured and unstructured data, respectively. The determination of the type of metadata may be important. In some embodiments, the assessment may be enhanced with metadata that is used to determine if the responses are structured data or unstructured data. A question may have metadata added, such as a question type, such as "multiple choice", "Likert", "open-ended", etc. The metadata may be used to interpret and format the data. The multiple choice questions may have a defined set of responses and may be considered structured data. The Likert questions may be on a scale. In some embodiments, the non-open-end questions represent structured data, and open-ended questions represent unstructured data. However, some structured data can be represented as unstructured data by representing the question and answer as a string. Metadata may also be used for non-assessment data. Data fields for a data source may be associated with a data type (or a data type can be inferred based on analyzing the data—e.g., whether the data is a string or number, whether it has low cardinality, etc.).

After determining the type of data, for each intervention modality, data from the assessment is input with a target intervention modality into respective models that analyze the structured data or unstructured data. At 210, the models 108 analyze the structured data or unstructured data with respect to the respective target intervention modality, and output fit prediction scores for the intervention modalities for the users. For example, as will be discussed in more detail below, server system 102 inputs structured data into a linear model and unstructured data into a language model. The linear model outputs a first fit prediction score and the language model outputs a second fit prediction score. In some embodiments, server system 102 may generate fit prediction scores for the intervention modalities that are available for each user. For example, if there are 25 intervention modalities available, server system 102 may generate 25 fit prediction scores from this linear model and 25 fit prediction scores from the language model for each user.

After determining the fit prediction scores, server system 102 may determine joint fit prediction scores by combining a fit prediction score from the linear model and a fit prediction score from the language model. Then, server system 102 analyzes the organizational constraints and the joint fit prediction scores to determine which users should be assigned to which interventions. For example, there may be a limitation on the number of interventions that are available in each intervention modality. Server system 102 may automatically assign users to interventions based on the joint fit prediction scores. For example, at 212, server system 102 optimizes assignments of interventions for all users based on joint fit prediction scores and the organizational constraints. In some embodiments, server system 102 may generate assignments to different intervention modalities based on the organizational constraints and provide basic statistics on why the user was assigned. For example, a 1-1 coaching may be assigned to a first user. A second user may be assigned to a group coaching intervention modality. In some examples, the first user may have had a higher joint prediction score for a fit with a 1-1 coaching and the second user may have had a higher joint prediction score with group coaching. However, the optimization problem using the organizational constraints may be much harder to determine based on a large number of users. By having joint fit prediction scores for all intervention modalities for all users, the assignment may be automatically performed. Using the joint fit prediction scores also improves the assignment by considering joint fit prediction scores for all intervention modalities together. Previously, a user may have only been considered for one intervention modality or very few due to limited resources and ratings.

The use of structured data allows the system to incorporate inputs for known drivers of coaching modality fit that are relatively common across users. It gives the system a basic sense of readiness and preferences. However, it may not be discriminating enough and may not cover enough data inputs to effectively predict assignments across coaching modalities. Therefore, the system leverages unstructured data to additionally incorporate richer inputs about the user. Unstructured user data, via an assessment or through use of a coaching modality, can contain rich and nuanced signals about a user's preferences and readiness that are not captured by structured data. Additionally, unstructured data allows the system to incorporate much broader, more diverse, and continuous data inputs, as it is not subject to structured data restrictions such as pre-defined data types or some inputs that require a user to submit an assessment.

Unstructured data increases data volume per user providing more data coverage; however, it also increases sparsity. That is, the unstructured data provides diverse information about each user, but the unstructured data does not provide information on the same things about each user. For example, for the data input of a user's level in their organization, individual contributor, a manager, a manager of managers, the data might be encoded in some unstructured data, but coverage is low. Structured data ensures coverage of these kinds of data inputs that are key drivers of fit and/or unlikely to be encoded in unstructured data.

There are additional advantages to this approach. The structured data model is inherently more interpretable, allowing for more visibility and configuration. On the other hand, the unstructured language model is more dynamic as it can incorporate more and fresher sources of data than the structured data model. Together, the two models complement each other to ensure the most optimal modality fit predictions.

Fit Prediction System

Figure 3:
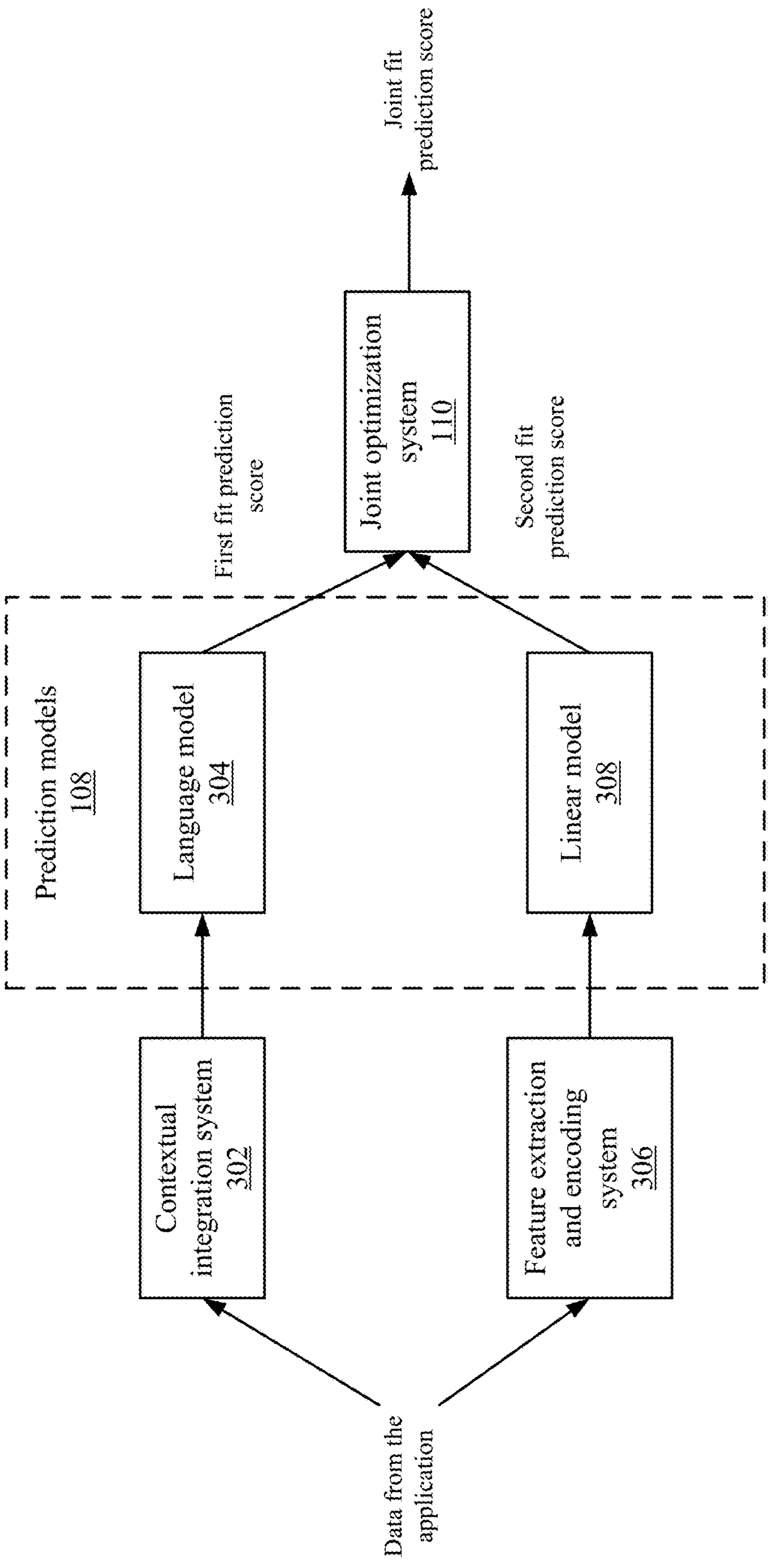
FIG. 3 depicts a more detailed example of the system to generate fit prediction scores according to some embodiments.

FIG. 3 depicts a more detailed example of the system to generate fit prediction scores according to some embodiments. Data from the application 112 is received at a contextual integration system 302 and a feature extraction and encoding system 306. The system may include two branches that generate two fit prediction scores. The use of two branches may improve the assignment of intervention modalities by focusing on different types of data in the two branches.

Feature extraction and encoding system 306 may extract values for features from the data from the application 112. An example of the features that are extracted may be data points such as a user's learning style preferences, past performance metrics, availability for coaching, etc. The values may be encoded into numerical values. The encoding generates a feature vector that represents the values for the feature. The feature vector may be an array of values that represent the structured data from application 112. Each element of the feature vector may correspond to a specific feature that is extracted.

The feature vector for the features and a target intervention modality is input into a linear model 308. Linear model 308 analyzes the feature vector to determine a second fit prediction score for the intervention modality. Second fit prediction scores may be generated for each intervention modality that is available. Linear model 308 may include a network of nodes that analyzes the values for the feature vector. For example, linear model 308 includes weights that may weight the respective features based on importance of the feature. The weighted values are then combined and analyzed through multiple layers of nodes to generate the second fit prediction score. For example, linear model 308 captures relationships between the structured data and the target intervention modality.

Linear model 308 may include independent variables that are used as predictors to predict the second fit prediction score. The dependent variable may be the target that is being predicted, such as the user's gain that may be expected from using the target intervention modality. Independent variables may be derived from structured data inputs that are received from the assessment. The inputs constitute a diverse spectrum of data, such as numerical, categorical or ordinal, and dichotomies. The dependent variables may be the measured efficacy and utilization of coaching interventions. Efficacy may be gauged through measurable outcomes obtained post-coaching, such as changes in skill assessments, as well as outcomes, such as promotions. The utilization rate reflects how frequently consistently the coaching intervention was employed by the individual. Promotions indicate promotions that may be received by the individual after coaching. Here, the gain is predicted for the dependent variable based on the use of the intervention modality.

In another branch, the unstructured data may be analyzed by a language model 304. The unstructured data may be based on text responses found in the data from the application. In some examples, the responses may be free-form answers received from users for the assessment, which may include raw text. In some examples, the raw text may be input into language model 304. However, server system 102 may improve the input that is provided using contextual integration system 302. For example, a context that is associated with text may be used to adjust the unstructured data that is input into language model 304. This provides an enhanced understanding of the unstructured data that may improve the output of language model 304. For example, the context may capture the semantics of user responses and provide a context to transform text in the unstructured data. The transformed text can be interpreted by language model 304.

After contextual integration system 302 may use the context to transform the unstructured data, the unstructured data may be converted into embeddings, which represent the unstructured data in a higher dimensional space. The embeddings are input into language model 304. A target of the intervention modality is also input into language model 304. Language model 304 analyzes the embedding, which represents the words of the unstructured input, to determine a first fit prediction score for the target intervention modality. For example, the first fit prediction score may predict the gain that may be received by the user using the intervention modality. In some embodiments, language model 304 may understand the context of the word based on its surrounding words in a sentence. This allows language model 304 to capture the nuances, sentiments, intricacies of language in the unstructured data that is received. This is crucial for interpreting the open-ended user responses in the unstructured data, and enables language model 304 to generate first fit projection scores for target intervention modalities.

By separating out the analysis of unstructured data and structured data, respective first prediction scores and second prediction scores may be more accurate in estimating the gain that may be received for respective intervention modalities. Because of the inherently limited dimensionality of structured data, especially when leveraged at scale, clusters of users can look quite similar, making it difficult for a single model to differentiate or "tie-break" fit predictions for users. Additionally, there is a large space of things that "might matter" for a modality fit prediction (a long tail of things that apply to a small subset of users), but it is practically impossible to gather inputs for all of these via structured data. Therefore, relying on purely structured data means the system cannot adapt to or incorporate knowledge of specific scenarios and factors not accounted for by the structured data (for example, if a user just had a newborn, or if a user is currently undergoing additional stress because of the departure of a friend at work). On the other hand, relying on purely unstructured data also makes the model blind to certain key factors that may be common to predicting modality fit and risks becoming too sensitive to the types of specific signals and scenarios included in the unstructured data.

Joint optimization system 110 may combine the first prediction score and the second prediction score to generate a joint fit prediction score period. In some embodiments, joint optimization system 110 may combine the scores using a weighted approach. In some embodiments, the weighting used for combination may be configured. For example, if a customer highly values interpretability of predictions, joint optimization system 110 may weight the linear model more strongly, or if for user input and data integration reasons one kind of data is more fresh or robust, the company may choose to weight one of the linear model of the language model more strongly. Additionally, the weighting could be tuned to be adaptive to model confidence. For some modalities, the linear model or language model might have more or less confidence, which may influence the model's weighting in the combination.

Figure 4:
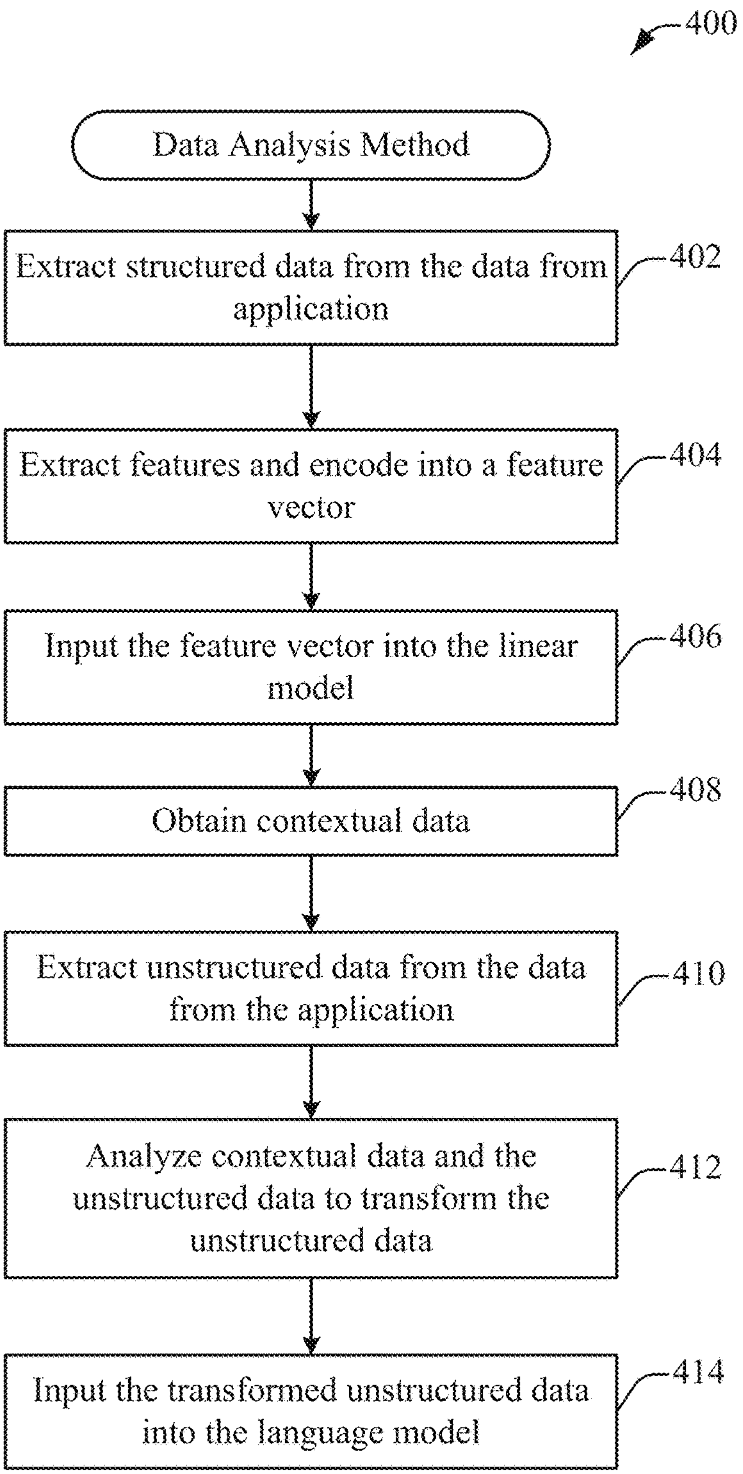
FIG. 4 depicts a simplified flowchart for analyzing structured data and unstructured data according to some embodiments.

FIG. 4 depicts a simplified flowchart 400 for analyzing structured data and unstructured data according to some embodiments. At 402, structured data is extracted from the data from the application. At 404, features are extracted and encoded into a feature vector. At 406, the feature vector is input into linear model 308.

At 408, contextual integration system 302 obtains contextual data. The contextual data may be extracted based on keys in the structured data. Contextual data is a form of metadata providing more information about the context and meaning of data. For example, a data input from a user might be "no", but this data input is impossible to interpret unless the system knows that this input was in response to the assessment question "Have you ever worked with a coach?". Contextual data may also encompass other metadata or analytics data such as the date when the data was created, further metadata about an assessment, such as question types (multiple choice, Likert, etc.), or other contextual data aiding in interpreting structured and unstructured data. The contextual data may be stored with keys in the structured data.

At 410, contextual integration system 302 extracts unstructured data from the data from the application. At 412, contextual integration system 302 analyzes the contextual data and the unstructured data to transform the unstructured data. At 414, the transformed unstructured data is input into language model 304.

Figure 5:
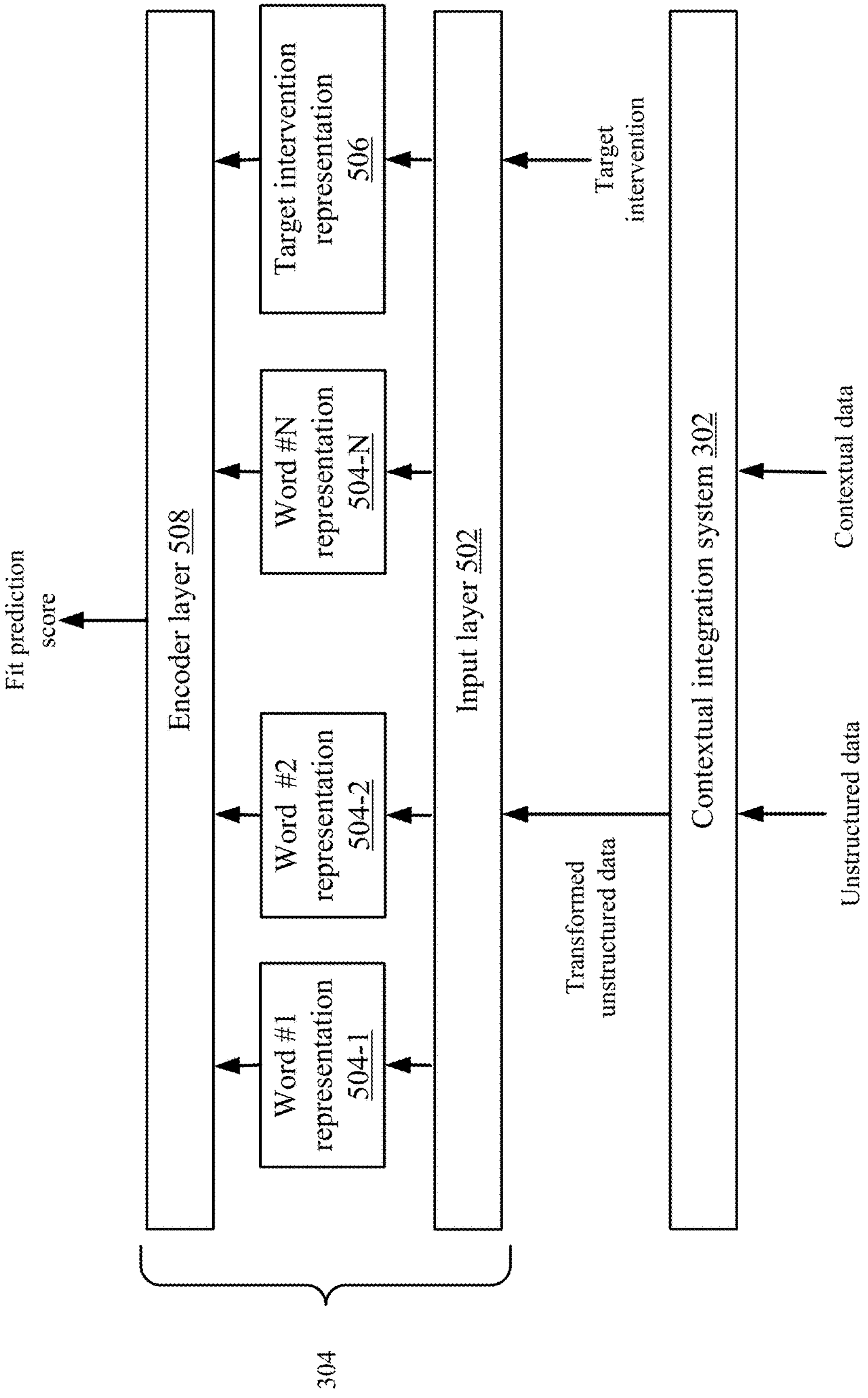
FIG. 5 depicts an example of a language model according to some embodiments.

In some embodiments, language model 304 may be implemented using a transformer, such as a bidirectional encoder representations from transformers (BERT). FIG. 5 depicts an example of language model 304 according to some embodiments. Language model 304 may be trained on unstructured data to generate fit prediction scores.

Contextual integration system 302 receives unstructured data and contextual data. Contextual integration system 302 may analyze the unstructured data and contextual data to transform the unstructured data. Then, contextual integration system 302 may output transformed unstructured data. In one example, the following transformations may be performed using contextual data, but other transformations may be appreciated. The data from application 112 may be:

{
"assessment_type": "coaching_readiness",
"item_key_1": 4,
"item_key_2": "yes",
"item_key_3": "increase my executive presence",
...
}

The assessment_type of coaching readiness may identify the type of question in the assessment. Item_key_1, Item_key_2, and Item_key_3 may identify answers to questions in the assessment that are received from a user. The item keys may be determined based on the questions. The keys are identifiers for the questions and are used to identify the questions and retrieve contextual data. Here, the answers are "4", "yes", and "increase my executive presence". Other data may also be received.

Then, contextual integration system 302 may retrieve metadata for the assessment based on a key from the data. The metadata may provide a context for the answers. The following is an example of the metadata:

{
"item_key_1": {"item_key_text": "Expanding my network and connecting with peers is a high priority for me", "item_type": "likert"},
"item_key_2": {"item_key_text": "I can block time during my work day for independent work or meetings.", "item_type": "yesno"}
"item_key_3": {"item_key_text": "What would you like to gain or achieve through coaching?", "item_type": "open_end"},
...
}

The metadata for respective keys of item_key_1, Item_key_2, and Item_key_3 is retrieved and describes a context of the respective answer. For example, for item_key_1, the context is "Expanding my network and connecting with peers is a high priority for me", "item_type": "Likert"" The user may have been asked to rate how much of a priority is expanding the user's network with peers from 1-5 in a Likert scale. This metadata provides a context for the answer of 4. For item_key_2, the context is "I can block time during my work day for independent work or meetings.", "item_type": "yesno"" The user may have been asked to rate if the user can block time for meetings during the day with an answer of yes or no. This metadata provides a context for the answer of yes. For item_key_3, the context is ""What would you like to gain or achieve through coaching?", "item_type": "open_end"" The user may have been asked to provide text for the question and the text may be open ended and not restricted to known answers. This metadata provides a context for the answer of "increase my executive presence".

Contextual integration system 302 may transform the unstructured data to:

Expanding my network and connecting with peers is a moderately high priority for me.

I can block time during my work day for independent work or meetings.

I would like to gain or achieve: increase my executive presence"

Here, the first answer of "4" is transformed into "Expanding my network and connecting with peers is a moderately high priority for me." Contextual integration system 302 reviews the value of "4" and the context to transform the data into a sentence that can be interpreted by language model 304. The transformed unstructured data may provide more context to language model 304, which can then provide a more accurate fit prediction score because additional context between words may be analyzed. For example, instead of a value of 4 being analyzed, language model 304 may analyze the relationship between words in the sentence and the target intervention modality. Also, for the second answer of "yes", the unstructured data is transformed into "I can block time during my work day for independent work or meetings." Again, the transformed unstructured data may provide more context to language model 304 because the sentence provides more context than the word of "yes" in relation to the target intervention modality. For the third answer, the answer of "increase my executive presence" may be transformed to a sentence with more context for what "increase my executive presence" means, in that this represents what the user would like to gain or achieve. The transformation may be performed using rules or a model that use the context and the unstructured data to generate the transformed unstructured data.

There may be one model per intervention modality. Transformed unstructured data is fed in as input with a modality fit score as output. An input layer 502 receives the transformed unstructured data, which is then converted into word embeddings, such as word #1 representation 504-1, word #2 representation 504-2, . . . , word #N representation 504-N. These embeddings represent the words from the unstructured data.

The unstructured data is input into an encoder layer 504, which uses a bidirectional transformer architecture to generate contextualized embeddings from the input data. The encoder layer processes these embeddings to create a final representation of the unstructured data.

A classification head then takes the final representation from the encoder layer 504 and applies additional layers to produce a classification fit score, which indicates the relevance or suitability of the unstructured data with respect to the target intervention.

In some embodiments, the input to the language model is tokenized text. The input text is first tokenized using a tokenizer. This involves breaking the text into subwords or tokens that the transformer model understands. For example, the sentence “I want better wellness” might be tokenized into tokens like [CLS], I, want, better, wellness, [SEP]. [CLS] is a token used for classification tasks, and [SEP] is a separator token for sentences. The language model uses attention masks to differentiate between actual tokens and padding tokens. Attention masks help the language model focus on real input tokens and ignore padding tokens during processing. The language model includes pre-trained transformer layers. The language model includes multiple layers that generate contextualized embeddings of input tokens based on the surrounding context. For classification tasks, the representation of the [CLS] token (which is the first token in the input) is used as the aggregate representation of the entire input sequence. In a fine-tuning process, a classification head is added on top of the pre-trained language model, which may be a feed-forward neural network (a single dense layer with sigmoid activation for binary classification). This layer takes the [CLS] token’s embedding and maps it to the classes in the classification task. This may form the prediction for the target intervention modality.

Training

Linear model 308 and language model 304 may be trained. Linear model 308 may be trained using a training process that may iteratively update the parameters of the model. For example, a gradient descent algorithm may be used to update model weights to minimize a cost function. A feature vector with a known outcome may be input into linear model 308. The output of linear model 308 may be compared with the known outcome. A loss may be determined based on the difference between the predicted outcome and the known outcome. Then, a training system may adjust the model weights to minimize a cost function of the difference between the predicted outcome and the known outcome. For example, during fine-tuning, the system may train the language model on a dataset such that the language model adjusts its weights to fit the known outcomes.

For language model 304, a pre-training and fine-tuning stage may be used. Pre-training stage may be performed using a large corpus of text data where language model 304 learns language representations for unstructured data. The fine-tuning may adjust the language representations and aligns them to specific tasks related to predicting fit scores for intervention modalities. The training may take unstructured data and provide some contextual data to generate transformed unstructured data. Then, an outcome label for the transformed unstructured data is determined. The transformed unstructured data may be input into language model 304, which generates a fit prediction score. The fit prediction score may be compared to the outcome label. Then, the parameters of language model 304 may be adjusted to minimize the difference between the fit prediction score and the outcome label. The outcome label may be determined based on the engagement with or efficacy of the intervention outcomes over time. By using the known outcomes, language model 304 may be trained to understand patterns and associations in unstructured data that may be able to predict future intervention success. In the fine-tuning stage, unstructured data from specific intervention modalities with known outcomes may be used to train language model 304. This allows language model 304 to learn relationships between unstructured data and the intervention modalities.

Figure 6:
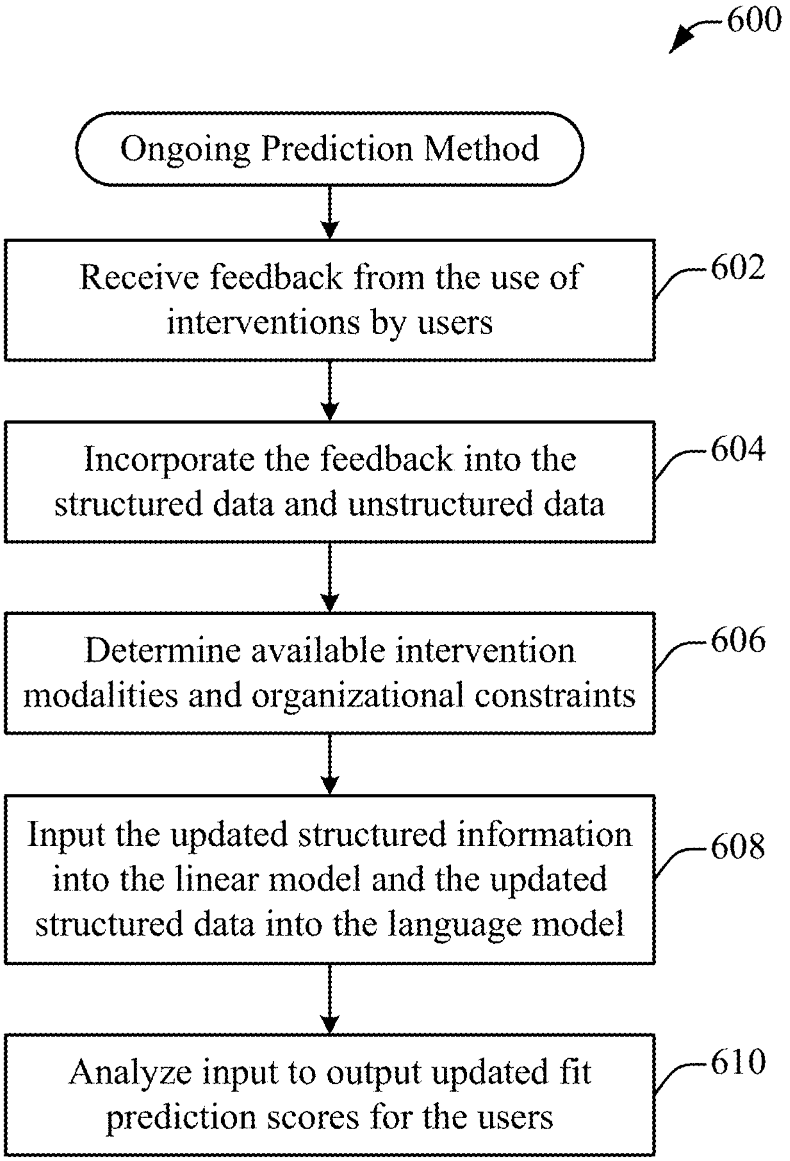
FIG. 6 depicts an example of determining fit prediction scores after interventions are assigned for an organization according to some embodiments.

Feedback from the use of interventions may be used to train linear model 308 and language model 304. For example, users may be assigned to interventions and use coaching application 112. The feedback may include different outcomes, such as promotions or ratings. The feedback may be used to reassign or generate new assignments for users. FIG. 6 depicts an example of determining fit prediction scores after interventions are assigned for an organization according to some embodiments. For example, after assigning users to different intervention modalities, the organization may want to evaluate the assignment, or reassign users to other intervention modalities that may be better fits. The analysis of feedback from the use of application 112 may be helpful to determine the fit to the new intervention modalities. At 602, the training system receives feedback from the use of interventions by users. The feedback may be different information, such as how many sessions a user attended, outcomes that may have resulted (e.g., promotions), etc.

At 604, the training system incorporates the feedback into the structured and unstructured data. For example, the feedback may be input as a feature in the structured data. Also, a context for the feedback may be used to determine text to input into language model 304, such as “The user received a promotion after participating in 1-1 coaching”.

At 606, server system 102 determines available intervention modalities and organizational constraints. For example, the intervention modalities may change or organizational constraints may change over time.

At 608, server system 102 inputs the updated structured information into the linear model 308 and the updated structured data into language model 304. At 610, the linear model 308 and language model 304 output fit prediction scores based on analyzing the input. For a first time use case, the models rely more on the assessment, but for reassignment, the model’s may rely more on data that has been generated by the usage of the assigned intervention modality.

CONCLUSION

Accordingly, an improved process for generating fit prediction scores is provided using multiple models. By separating out structured data and unstructured data, and analyzing them separately, more accurate assignments to intervention modalities can be determined.

System

Figure 7:
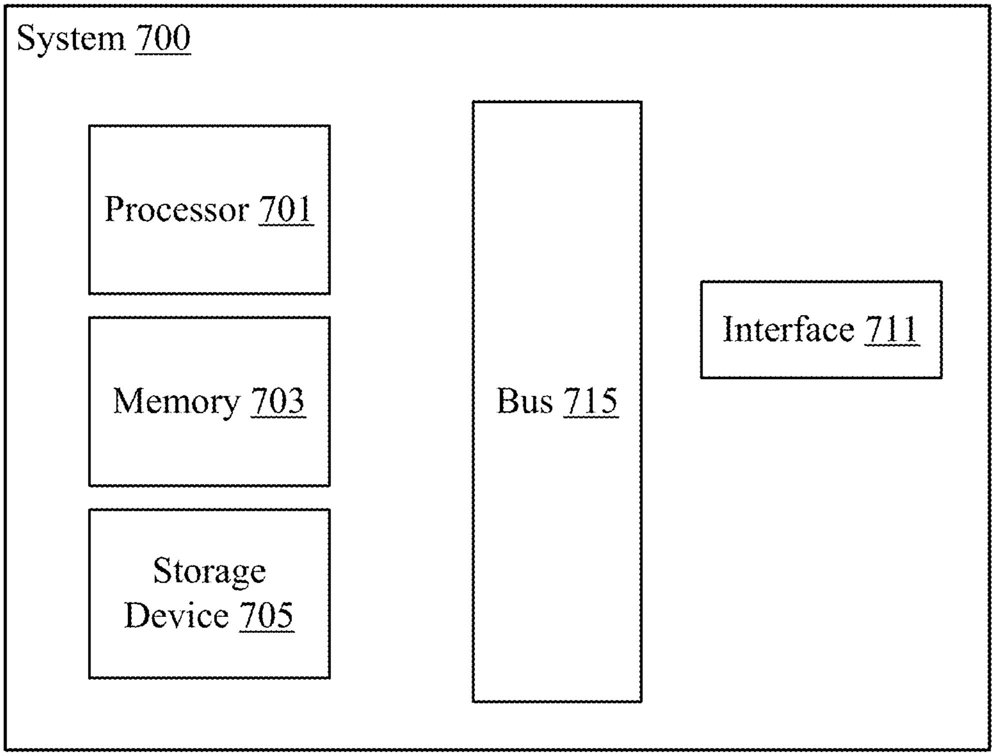
FIG. 7 illustrates one example of a computing device according to some embodiments.

FIG. 7 illustrates one example of a computing device according to some embodiments. According to various embodiments, a system 700 suitable for implementing embodiments described herein includes a processor 701, a memory 703, a storage device 705, an interface 711, and a bus 715 (e.g., a PCI bus or other interconnection fabric.) System 700 may operate as a variety of devices such as server system 102, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. Memory 703 may be random access memory (RAM) or other dynamic storage devices. Storage device 705 may include a non-transitory computer-readable storage medium holding information, instructions, or some combination thereof, for example instructions that when executed by the processor 701, cause processor 701 to be configured or operable to perform one or more operations of a method as described herein. Bus 715 or other communication components may support communication of information within system 700. The interface 711 may be connected to bus 715 and be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:

receiving data for a user from an application that is used for an intervention;

analyzing the data to determine unstructured data and structured data;

determining a portion of structured data that is associated with a portion of unstructured data;

extracting a context from the portion of the structured data and associating the context with the portion of unstructured data;

transforming the portion of unstructured data to transformed unstructured data by adding text from the context to the portion of unstructured data;

analyzing the transformed unstructured data via a first model to generate a first prediction fit score for an intervention modality, wherein the first model is configured to analyze text of the transformed unstructured data to determine a fit with the intervention modality, wherein the first model comprises:

a first layer configured to receive the transformed unstructured data and the intervention modality, the first layer configured to transform words of the transformed unstructured data to word representations and the intervention modality to an intervention modality representation; and a second layer configured to process the word representations and the intervention modality representation to determine the fit between the word representations and the intervention modality representation;

analyzing the structured data via a second model to generate a second prediction fit score for the intervention modality, wherein the second model is configured to analyze numerical values for features of the structured data to determine the fit with the intervention modality; and combining the first prediction fit score and the second prediction fit score to determine a third score that rates the fit of the user to the intervention modality.

2. The method of claim 1, wherein:

the data is received from an assessment that includes questions, and the data includes answers to the questions.

3. The method of claim 1, wherein analyzing the data comprises:

detecting structured data in the data based on a first type of metadata for the data, and detecting unstructured data in the data based on a second type of metadata for the data.

4. The method of claim 1, wherein determining the context comprises:

determining a key in the data; and retrieving metadata for the key.

5. The method of claim 4, wherein the metadata is used to transform the unstructured data.

6. The method of claim 4, wherein the transformed unstructured data replaces text in the unstructured data with text from the context.

7. The method of claim 1, wherein analyzing the transformed unstructured data comprises:

inputting text of the transformed unstructured data into the first model and the intervention modality, wherein the first model analyzes the text to determine the fit with the intervention modality.

8. The method of claim 7, wherein the text is analyzed in bidirectionally to determine relationships between the text and the intervention modality.

9. The method of claim 7, wherein:

the transformed unstructured data is input as a first sentence into the first model, and the intervention modality is input as a second sentence into the first model.

10. The method of claim 1, wherein analyzing the structured data comprises:

determining a feature vector from the structured data;

inputting the feature vector into the second model; and mapping the feature vector to the fit with the intervention modality.

11. The method of claim 1, wherein combining the first prediction fit score and the second prediction fit score comprises:

using a weighted combination of the first prediction fit score and the second prediction fit score.

12. The method of claim 1, further comprising:

using the third score to automatically assign the user to one of a plurality of intervention modalities.

13. The method of claim 1, further comprising:

generating a plurality of third scores for a plurality of intervention modalities for the user;

generating a plurality of third scores for the plurality of intervention modalities for a set of other users; and analyzing the plurality of third scores for the user and the plurality of third scores for the set of other users to automatically assign an intervention modality in the plurality of intervention modalities to the user and users in the set of other users.

14. A non-transitory computer-readable storage medium having stored thereon computer executable instructions, which when executed by a computing device, cause the computing device to be operable for:

receiving data for a user from an application that is used for an intervention;

analyzing the data to determine unstructured data and structured data;

determining a portion of structured data that is associated with a portion of unstructured data;

extracting a context from the portion of the structured data and associating the context with the portion of unstructured data;

transforming the portion of unstructured data to transformed unstructured data by adding text from the context to the portion of unstructured data;

analyzing the transformed unstructured data via a first model to generate a first prediction fit score for an intervention modality, wherein the first model is configured to analyze text of the transformed unstructured data to determine a fit with the intervention modality, wherein the first model comprises:

a first layer configured to receive the transformed unstructured data and the intervention modality, the first layer configured to transform words of the transformed unstructured data to word representations and the intervention modality to an intervention modality representation; and a second layer configured to process the word representations and the intervention modality representation to determine the fit between the word representations and the intervention modality representation;

analyzing the structured data via a second model to generate a second prediction fit score for the intervention modality, wherein the second model is configured to analyze numerical values for features of the structured data to determine the fit with the intervention modality; and combining the first prediction fit score and the second prediction fit score to determine a third score that rates the fit of the user to the intervention modality.

15. The non-transitory computer-readable storage medium of claim 14, wherein:

the data is received from an assessment that includes questions, and the data includes answers to the questions.

16. The non-transitory computer-readable storage medium of claim 14, wherein analyzing the data comprises:

detecting structured data in the data based on a first type of metadata for the data, and detecting unstructured data in the data based on a second type of metadata for the data.

17. The non-transitory computer-readable storage medium of claim 14, wherein analyzing the transformed unstructured data comprises:

inputting text of the transformed unstructured data into the first model and the intervention modality, wherein the first model analyzes the text to determine the fit with the intervention modality.

18. An apparatus comprising:

one or more computer processors; and a computer-readable storage medium comprising instructions for controlling the one or more computer processors to be operable for:

receiving data for a user from an application that is used for an intervention;

analyzing the data to determine unstructured data and structured data;

determining a portion of structured data that is associated with a portion of unstructured data;

extracting a context from the portion of the structured data and associating the context with the portion of unstructured data;

transforming the portion of unstructured data to transformed unstructured data by adding text from the context to the portion of unstructured data;

analyzing the transformed unstructured data via a first model to generate a first prediction fit score for an intervention modality, wherein the first model is configured to analyze text of the transformed unstructured data to determine a fit with the intervention modality, wherein the first model comprises:

a first layer configured to receive the transformed unstructured data and the intervention modality, the first layer configured to transform words of the transformed unstructured data to word representations and the intervention modality to an intervention modality representation; and a second layer configured to process the word representations and the intervention modality representation to determine the fit between the word representations and the intervention modality representation;

analyzing the structured data via a second model to generate a second prediction fit score for the intervention modality, wherein the second model is configured to analyze numerical values for features of the structured data to determine the fit with the intervention modality; and combining the first prediction fit score and the second prediction fit score to determine a third score that rates the fit of the user to the intervention modality.

19. A method comprising:

receiving data for a user from an application that is used for an intervention;

analyzing the data to determine unstructured data and structured data;

determining a portion of structured data that is associated with a portion of unstructured data;

extracting a context from the portion of the structured data and associating the context with the portion of unstructured data;

transforming the portion of unstructured data to transformed unstructured data by adding text from the context to the portion of unstructured data;

analyzing the transformed unstructured data via a first model to generate a first prediction fit score for an intervention modality, wherein the first model is configured to analyze text of the transformed unstructured data to determine a fit with the intervention modality, wherein analyzing the transformed unstructured data comprises inputting text of the transformed unstructured data into the first model and the intervention modality, wherein the first model analyzes the text to determine the fit with the intervention modality, and wherein the transformed unstructured data is input as a first sentence into the first model and the intervention modality is input as a second sentence into the first model;

analyzing the structured data via a second model to generate a second prediction fit score for the intervention modality, wherein the second model is configured to analyze numerical values for features of the structured data to determine the fit with the intervention modality; and combining the first prediction fit score and the second prediction fit score to determine a third score that rates the fit of the user to the intervention modality.

20. The method of claim 19, wherein the text is analyzed in bidirectionally to determine relationships between the text and the intervention modality.

* * * * *